United States Patent
Raffle et al.

(10) Patent No.: US 8,320,961 B2
(45) Date of Patent: Nov. 27, 2012

(54) APPARATUS FOR A TANGIBLE INTERFACE

(75) Inventors: Hayes Raffle, Palo Alto, CA (US);
Koichi Mori, San Jose, CA (US);
Mirjana Spasojevic, Palo Alto, CA (US); Rafael A. Ballagas, Palo Alto, CA (US)

(73) Assignee: Nokia Corporation, Espoo (FI)

( * ) Notice: Subject to any disclaimer, the term of this patent is extended or adjusted under 35 U.S.C. 154(b) by 105 days.

(21) Appl. No.: 12/650,059

(22) Filed: Dec. 30, 2009

(65) Prior Publication Data
US 2011/0159923 A1   Jun. 30, 2011

(51) Int. Cl.
*H04B 1/38* (2006.01)

(52) U.S. Cl. .................. 455/557; 455/550.1; 455/575.1; 455/347; 455/90.3; 248/309.1; 248/316.8; 312/7.1

(58) Field of Classification Search .................. 455/557, 455/550.1, 575.1, 347, 90.3; 248/309.1–316.8; 312/7.1
See application file for complete search history.

(56) References Cited

U.S. PATENT DOCUMENTS

| | | | |
|---|---|---|---|
| 5,959,287 A | 9/1999 | Myers | |
| 6,102,284 A | 8/2000 | Myers | |
| 6,668,178 B1 | 12/2003 | Ramaswamy | |
| 6,995,542 B2 | 2/2006 | Yu et al. | |
| 2002/0103008 A1 | 8/2002 | Rahn | |
| 2003/0130567 A1* | 7/2003 | Mault et al. | 600/300 |
| 2007/0026799 A1* | 2/2007 | Wang et al. | 455/41.2 |
| 2009/0221327 A1* | 9/2009 | Tanaka et al. | 455/557 |
| 2010/0137790 A1* | 6/2010 | Yodfat | 604/67 |
| 2010/0146308 A1* | 6/2010 | Gioscia et al. | 713/300 |

FOREIGN PATENT DOCUMENTS

| | | |
|---|---|---|
| EP | 1622341 A2 | 2/2006 |
| EP | 2003802 A1 | 12/2008 |
| EP | 2068418 A2 | 6/2009 |

OTHER PUBLICATIONS http://en.wikipedia.org/wiki/Tangible_User_Interface, "Tangible User Interface", Wikipedia, retrieved Aug. 20, 2011, 6 pages.
http://tangible.media.mit.edu/projects/intouch/, "inTouch", MIT Tangible Media Group, retrieved Aug. 20, 2011, 3 pages.
Corcoran, Peter M., et al., "Wireless Transfer of Images from a Digital Camera to the Internet via a Standard GSM Mobile Phone", IEEE Transactions on Consumer Electronics, vol. 47, No. 3, Aug. 2001, pp. 542-547.

* cited by examiner

*Primary Examiner* — Ajit Patel
*Assistant Examiner* — Khai M Nguyen
(74) *Attorney, Agent, or Firm* — Harrington & Smith

(57) ABSTRACT

In accordance with an example embodiment of the present invention, a cradle comprising: a housing configured to receive a mobile device; wherein the housing configured to receive a mobile device having at least two positions; a detecting element configured to detect a state of the mobile device and; a mechanism configured to change position of the housing in response to detecting a change in the state of the mobile device.

15 Claims, 3 Drawing Sheets

APPARATUS FOR A TANGIBLE INTERFACE

TECHNICAL FIELD

The present application relates generally to a tangible interface between a mobile device and an accessory.

BACKGROUND

Mechanical position of objects has been used as an indicator traditionally, for example an icon on a computer display indicates a received message or a toaster pops up when the bread is done. These perceivable and mechanical interfaces may make the interaction between a user and a device easier and more appealing. Detectable appearances in the interfaces may be used to engage different users to communicate with each other. For example young children, elderly people, impaired people in addition to an, adult user or a teenager may have some difficulties in using the mobile device independently.

SUMMARY

Various aspects of examples of the invention are set out in the claims.

According to a first aspect of the present invention, a cradle comprising: a housing configured to receive a mobile device; wherein the housing configured to receive a mobile device having at least two positions; a detecting element configured to detect a state of the mobile device and; a mechanism configured to change position of the housing in response to detecting a change in the state of the mobile device.

According to a second aspect of the present invention, a cradle comprising means for receiving an mobile device, wherein the means for receiving having at least two positions; means for detecting a state of the mobile device and; means for changing position of the receiving means in response to detecting a change in the state of the mobile device.

According to a third aspect of the present invention, a method comprising receiving an mobile device on one of at least two positions detecting a state of the mobile device; and changing position to another of the at least two positions in response to detecting a change in the state of the mobile device.

According to a fourth aspect of the present invention, an apparatus comprising the at least one memory and a computer program code configured to, with the at least one processor, cause the apparatus to perform at least the following: detecting state of the mobile device received by the apparatus having two positions and changing position of said housing in response to detecting the change in the state of a mobile device.

According to a fifth aspect of the present invention, a computer program product comprising a computer-readable medium bearing computer program code embodied therein for use with a computer, the computer program code comprising: code for detecting state of the mobile device received by a housing having at least two positions and code for changing position of the housing in response to detecting a change in the state of the mobile device.

According to a sixth aspect of the present invention, a computer-readable medium encoded with instructions that, when executed by a computer, cause preformation of: detecting state of the mobile device received by a housing having two positions; and changing position of said housing in response to detecting a change in the status of the mobile device.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

An example embodiment of the present invention and its effects are understood by referring to FIGS. 1 through 4B of the drawings.

Figure 1:
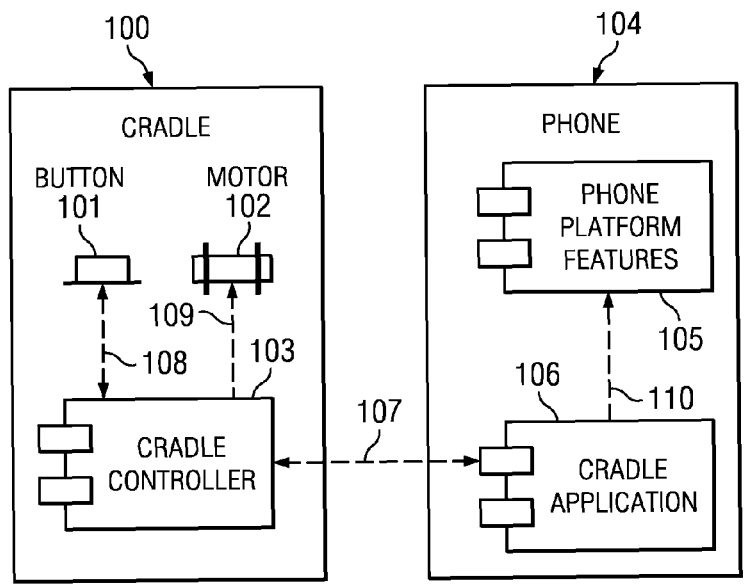
FIG. 1 describes a system comprising a mobile device and a cradle as an example embodiment according to the invention.

FIG. 1 describes an example embodiment according to the invention, wherein a system comprises a first device 100 and a second device 104. The first device 100 may be an accessory, and in this example embodiment it is a cradle. The cradle 100 may contain mechanical components, for example an input device 101. The cradle 100 may contain a motor 102. The cradle may contain for example a controller 103. The second device 104 in a system of FIG. 1 comprises a mobile device. The mobile device 104 may contain software components and mechanical components. The mobile device 104 may contain an application 106. A first line 107 describes a communication between the cradle 100 and the mobile device 104. The communication may comprise a two-way communication between the mobile device 104 and the cradle 100; or a one-way communication from the cradle 100 to the mobile device 104; or a one-way communication from the mobile device 104 to the cradle 100. A line 108 describes a communication from the controller 103 of the first device 100 to the input device 101 of the first device. A line 109 describes a communication from the controller 103 to the motor 102 of a first device 100. A line 110 describes a communication from the application 106 of the second device 104 to phone platform features 105.

Figure 2:
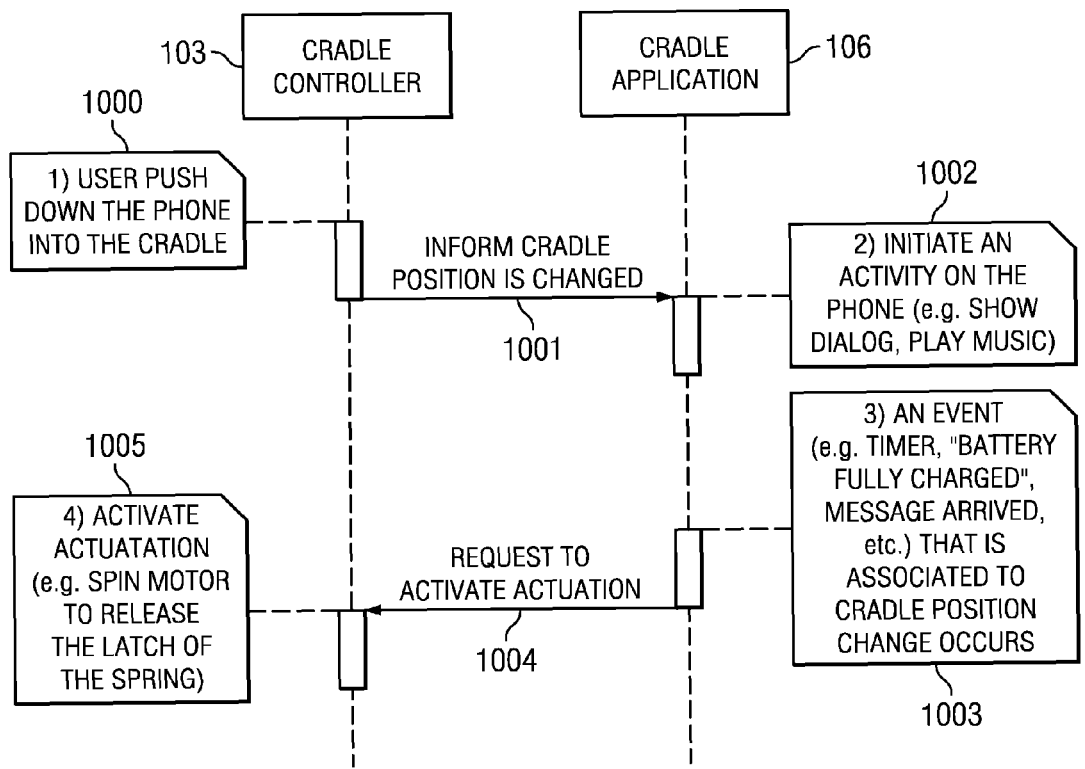
FIG. 2 describes an example of a software sequence diagram according to an embodiment of the invention.

FIG. 2 describes an example according to an embodiment of the invention. In this example embodiment, the controller 103 is configured to communicate with the application 106 according to a position of a sensor in the cradle 100, e.g. when, according to the embodiment of FIG. 2, a user pushes down the mobile device 104 into the cradle 100 at 1000. When a mobile device 104 is pushed to a cradle 100, a sensor in a cradle is activated. In one example, the sensor is a button, which is pushed down with the inserted mobile device 104. In response to activated sensor in a cradle, the cradle controller 103 is configured to communicate 1001 the change of position of a button or the change of position of a mobile device 104 in the cradle 100 to the application 106. In response to receiving communication of the change of either of the previous positions, the application 106 is configured to 1002 initiate an activity on the mobile device 104. The activity may be for example that a dialog is shown on a display or music is played 1003 an event that is associated in the cradle application 106 to the cradle position change occurs. This event may be for example a timer or a message relating to the cradle position change. This event may be predetermined. In response to detecting the event associated to the cradle position change the cradle application is configured to communicate a request 1004 to cradle. Cradle controller 103 is configured to activate actuation in the cradle 100 according to actuation request 1004 sent by the application 106 of the mobile device 1005 an actuator is activated. The actuator may be any kind of electrical or mechanical or other kind of actuator, which evokes certain perceivable or mechanical change. The activation may be for example to spin a motor to release a latch or to send an electric activation signal or to activate a vibration motor, or any other mechanical or electrical activation of a cradle part that is configured to perform a mechanical change.

According to an example embodiment of the invention, the cradle 100 comprises 3 or more positions; a predetermined state of the mobile device 104 may cause the cradle to move into a predetermined position.

Figure 3:
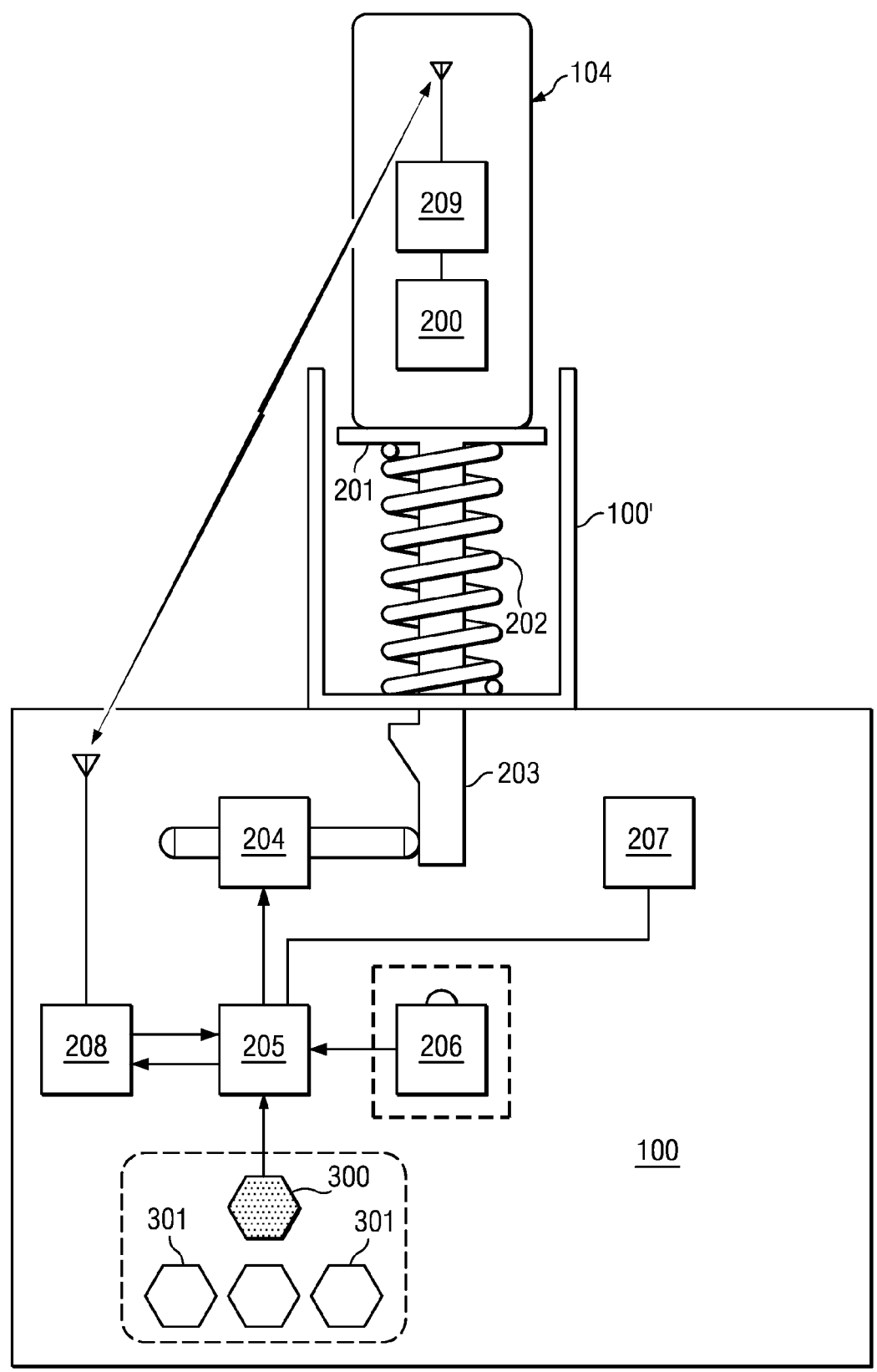
FIG. 3 describes an example of mechanical and electrical components according to an embodiment according to the invention.

FIG. 3 describes an example embodiment according to the invention, the mechanical and electrical components of a mobile device 104 and cradle 100 system. Element 200 describes software in the mobile device 104. Element 201 describes a plunger in the cradle 100. The plunger 201 may act as a contact point for the mobile device 104 in the cradle 100 and the plunger 201 may be relatively movable in the cradle 100 when a user pushes the mobile device 104 down in the cradle 100. The movability can be seen in more detail in FIG. 4A and 4B later in the description. A spring 202 configured to enable movement of the plunger 201. The spring 202 may be surrounding the the plunger 201, as in the example of FIG. 3, or the spring may be in other situation, like under the plunger. The spring may be for example a compression spring or a torsion spring or a clock spring or a tension spring or any other type of spring which is suitable for the cradle 100. The spring 202 may be configured to aid the plunger 201 in the relative movement when user pushes the mobile device 104 down in the cradle 100. Element 203 describes a latch in the cradle 100. The latch 203 may be configured to lock the plunger 201 in the down position when the mobile device 104 has been placed to the cradle 100. The latch may be locked to a down position, where the spring force maintains the plunger in the down position xxx. The latch 203 may be released, releasing spring force in FIG. 2 and enabling return of a plunger to an up position. In this embodiment the latch is used for ejecting the mobile device 104 from the cradle 100. The cradle comprises an actuator 204. The actuator 204 may be configured to receive communication from the machine control unit (MCU) 205 in the FIG. 3. The actuator may be configured to activate a movement of the latch 203 according to the activation (?)received from the MCU 205. The cradle comprises a sensor 206. The sensor 206 may be configured to sense a movement of the latch 203. Sense of movement may result from the latch 203 is moving in relation to the sensor 206; or touching the sensor 206. The sensor 206 can be any type of sensor suitable for the example embodiment of the invention, for example an accelerometer. According to another example embodiment of the invention, the sensor 206 may be located instead of the cradle 100, in the mobile device 104. In this example embodiment, the sensor in the mobile device 104 may be configured to sense for example the movement of the latch 203 or the movement of the mobile device 104 itself. The cradle 100 comprises a power unit 207. The power unit 207 may be configured to connect with the MCU 205. The cradle 100 may comprise an element 208 which describes any transmitter or receiver cabable of being configured to transmit or receive signals in generic radio technology, for example but not limited to BT (Bluetooth), XBee, GSM (Global System for Mobile communication), FM (Frequency Modulation), AM (Amplitude modulation). Element 209 in the mobile device 104 describes any transmitter or receiver cabable of being configured to transmit or receive signals in generic radio technology, for example but not limited to BT (Bluetooth), XBee, GSM (Global System for Mobile communication), FM (Frequency Modulation), AM (Amplitude modulation).

According to one example embodiment of the invention, the cradle 100 may include a token reader and tokens configured to tangible input. A token is an item which is known from for example toys. It is an item which may have a coin like shape and size and which has a combination of protrusions molded on to the surface of the token. When the token is placed into a token reader which in the example embodiment of the invention is part of a cradle 100, the protrusions come into contact with input elements, for example buttons, in the token reader. When a token is placed into a token reader a combination of buttons is pressed. Other type of token readers can be used in the example embodiment of the invention, for example a token reader which comes into contact with a token by RFID (Radio Frequency Identification). In an example embodiment of the invention, different tokens launch different applications that reside on the mobile device 104. For example a token with a picture of a cartoon character launch a cartoon in the mobile device 104 when the mobile device 104 is put into the cradle 100. In an example embodiment of the invention, tokens with printed pictures of family members on the surface of the tokens can launch for example a video of mom in the mobile device 104. In an example embodiment of the invention, the mobile device 104 is configured to fetch the application, for example a video, from a web service.

According to one example embodiment of the invention, the wireless communication, described earlier in the description, may be replaced by an electrical socket, a wireless connection. This example embodiment of the invention may be a lower cost system and allows the mobile device 104 to power the cradle 100. In this example embodiment both the mobile device 104 and the cradle 100 may be mechanically compatible to enable the needed mechanical connection between the mobile device 104 and the cradle 100. This example embodiment may enable for example a charging connection between the mobile device 104 and the cradle 100 and the user is able to charge the mobile device 104 in the cradle 100. The mechanism in this example embodiment may be similar with what has been described earlier in the description in connection with the FIGS. 1 to 4B. The user pushes down the mobile device 104 in the cradle 100, an electrical socket in the cradle may be configured to connect with the mobile device 104 when the mobile device 104 is pushed in the cradle 100. A sensor (like element 206) may be configured to sense a movement or a touch of a latch (like element 203) when the mobile device 104 is pushed down in the cradle 100. The sensor (like element 203) may communicate with a MCU (like element 205) and the MCU may further communicate with an actuator (like element 204) which may be configured to activate a movement of the latch (like element 203) ejecting the mobile device 104 from the cradle 100, when the mobile device 104 is fully charged.

Figure 4A:
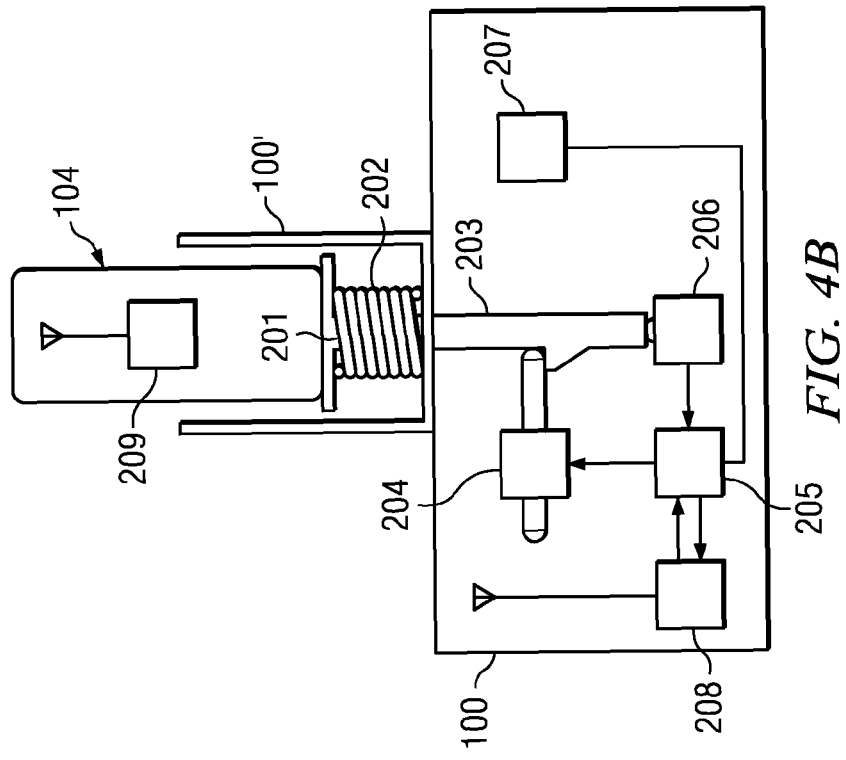
FIG. 4A describes an example of a mobile device in an up-position in a cradle according to an embodiment of the invention.

FIG. 4A describes an example embodiment of the invention, resembling the FIG. 3. In this example embodiment the mobile device 104 is in up position or configuration in relation to the cradle 100. In this up configuration the mobile device 104 has been placed in the cradle 100.

Figure 4B:
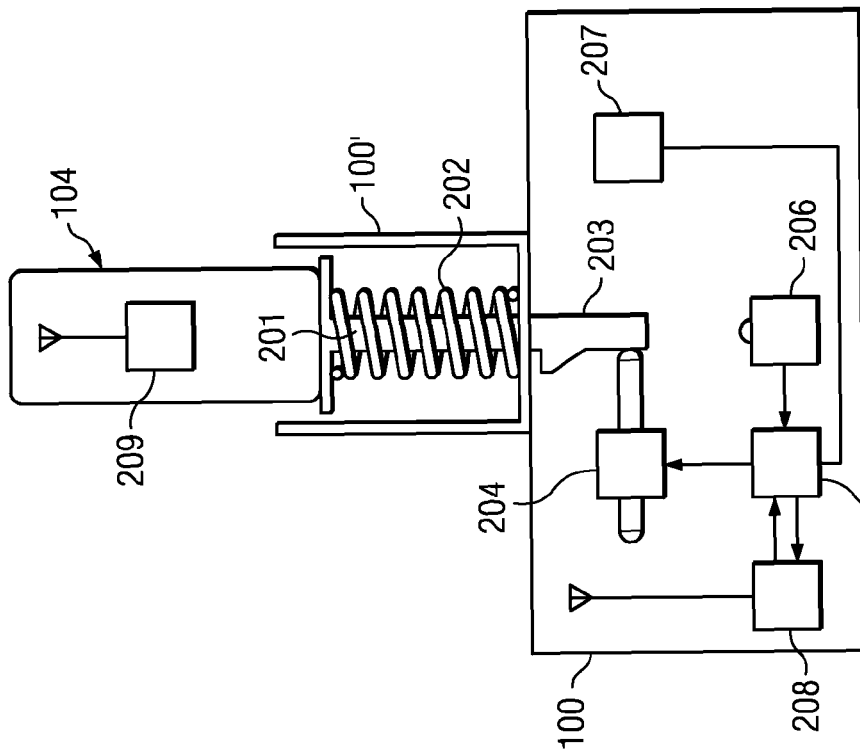
FIG. 4B describes an example of a mobile device in a down-position in a cradle according to an embodiment of the invention.

FIG. 4B describes an example embodiment of the invention. In this example embodiment the mobile device 104 and the cradle 100 system may be in a so called down configuration. In this down configuration the mobile device 104 is inserted down to the cradle 100. The elements shown in FIGS. 4A and 4B have been described earlier in the description regarding the figures.

According to one example embodiment of the invention, the system comprises a first cradle 100A and a second cradle 100B and in both cradles 100A and 100B, there are mobile devices 104A and 104B integrated in to the cradles. There is a push button 300 in both of the cradles 100A and 100B. When user A pushes the button in his cradle 100A, the mobile device 104A takes a picture from the user A and the mobile device 104A is configured to send the picture over the internet to user B in his mobile device 104B. User B can then push the button in his cradle 100B and the mobile device 104B takes a picture from the user B and the mobile device 104B is configured to send the picture over the internet to user A in his mobile device 104A. The picture may be sent also by using Bluetooth, Short Message Service (SMS), Over The Air (OTA) or any other wireless or wired communication system. According to one example embodiment of the invention, instead or in addition to a picture, an audio message for example a song or a multimedia message can be sent in a way described relating to the picture taken from user A and user B. The multimedia message may comprise for example a video. This example embodiment is not shown in the figures.

According to one example embodiment of the invention, the system comprises a token reader 300 in the cradle 100 and tokens 301 which may be separate accessories to this particular cradle 100. When a user places a token into the cradle 100 into which a mobile device 104 has been placed, a picture representing for example a person in the token is shown on the mobile device 104 display. According to one example embodiment of the invention, the system comprises a token reader 300 in the cradle 100 and tokens 301 which can be separate accessories to this particular cradle 100. When a user places a token into the cradle 100 into which a mobile device 104 has been placed, a song representing for example a person in the token 301 is played in the mobile device 104. For example a lullaby is played when a picture of a mum or dad is in the token and the token is placed in the cradle 100. The tokens may have a combination of bumps molded into the tokens, and the bumps push buttons in a token reader 300. When a token is inserted into the cradle 100, a combination of buttons may be pressed. In this example embodiment no Radio Frequency Identification (RFID) might be required. The token reader 300 might have other mechanical features as well, for example in addition or instead of the bumps, there might be protrusions molded into the token reader 300. Another example embodiment of how the tokens 301 might be used with the cradle 100 is a video sharing application. The tokens 301 might have printed photos of for example family members on them. For example, a child may put a token 301 with "mom" into the token reader 300, and then press the mobile device 104 down. When the mobile device 104 is pushed down, the mobile device 104 pops up with a video of mom shown on the mobile device 104. The video could be fetched from fore example a web service or a like or the video could be sent directly to the mobile device 104 by mom, from her mobile device. The mobile device can also automatically make a video of the child watching the "mom video" and then send this video back to mom either via a web service, or directly to mom's mobile device.

According to an example embodiment of the invention a system according to the invention may enable recycling of mobile phones. The older mobile phones may have a second lifetime when they become a part of the system according to the invention. The mobile phones can be placed in the cradle and they act as communication devices with the tangible user interface for example young children. The mobile phones may function as such, with no particular software up-date, in the cradle.

Without in any way limiting the scope, interpretation, or application of the claims appearing below, a technical effect of one or more of the example embodiments disclosed herein is to enable easy and simple communication. Another technical effect of one or more of the example embodiments may be a tangible interface between a mobile device and an accessory. Another technical effect of one or more of the example embodiments disclosed herein is to enable easy and simple communication via tangible interface. Another technical effect of one or more of the example embodiments disclosed herein is to give a second lifetime to mobile phones. Another technical effect of one or more of the example embodiments disclosed herein is to enable use of a mobile device intuitively, without need of extra instructions.

According to one example embodiment, a tangible interface may be a solution to encourage and engage e.g. the young children to communicate with for example family members who are not at close proximity. And encourage and engage distant family members to be in touch easily without any specific computer skills to set up a meeting with the family members. The tangible interface may add kinetic and tangible dimension to user interaction. An accessory may become an extension of the mobile device software application and allow new ways for users to provide program input and for the program to display output information. An accessory for a mobile device may become a toy like device which enables simple and fun experience with a mobile device. For example a cradle may change its mechanical position in response to the state of software on a mobile device The term cradle used in the application may refer to a holder or an accessory for a mobile device. The term mobile device used in the application may refer to any hand held device such as for example but not limited to, a mobile phone, a Personal Digital Assistant (PDA), a music player, an electronic book, an internet tablet. The term token reader used in the application may refer to a reader configured to read instructions from a token and forward the instructions to a control block or alike to be executed.

According to an example embodiment of the present invention, there may be a cradle wherein the housing is configured to receive a mobile device to its current position.

According to an example embodiment of the present invention, there may be a cradle wherein the change in the mobile device position according to the change of position of the housing is configured to activate the mobile device.

According to an example embodiment of the present invention, an activation comprises at least one of activating application in the mobile device and change a variable in an application in the mobile device.

According to an example embodiment of the present invention there may be a cradle, wherein the detecting element comprises a sensor located in the mobile device or in the cradle.

According to an example embodiment of the present invention there may be a cradle, wherein the change in the mobile device position comprises one of upwards and downwards movement in the cradle.

According to an example embodiment of the present invention there may be a cradle, wherein the change in the mobile device position comprises at least an upward movement in the cradle.

According to an example embodiment of the present invention there may be a cradle, wherein the application is one of the following; audio application, video application, multimedia message.

According to an example embodiment of the present invention there may be a cradle, wherein the sensor is an accelerometer.

According to an example embodiment of the present invention there may be a cradle comprising a token reader.

According to an example embodiment of the present invention there may be a cradle comprising tokens.

According to an example embodiment of the present invention there may be a mobile device comprising one of the following; a mobile phone, a personal digital assistant, a music player, an electronic book, an internet tablet.

According to an example embodiment of the present invention there may be a cradle, wherein the change in the state of the mobile device is predetermined.

According to an example embodiment of the present invention there may be a cradle, comprising means for receiving having three or more positions; means for detecting a predetermined state of the mobile device; means for changing a predetermined position of the receiving means in response to detecting the predetermined change in the state of the mobile device.

Embodiments of the present invention may be implemented in software, hardware, application logic or a combination of software, hardware and application logic. The software, application logic and/or hardware may reside on a mobile device or an accessory. If desired, part of the software, application logic and/or hardware may reside on a mobile device, part of the software, application logic and/or hardware may reside on an accessory. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a mobile device, with one example of a mobile device described and depicted in FIGS. 3 and 4A and 4B. A computer-readable medium may comprise a computer-readable storage medium that may be any media or means that can contain or store the instructions for use by or in connection with an instruction execution system, apparatus, or device, such as a mobile device.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. An apparatus comprising:
    a housing configured to receive a mobile device; wherein the housing is configured to receive a mobile device having at least two positions;
    a controller connected to the housing;
    a detecting element connected to the controller, where the detecting element is configured to detect a state of the mobile device;
    a mechanism configured to change position of the housing in response to detecting a change in the state of the mobile device;
    a token reader connected to the controller; and
    tokens, where the tokens are associated with an application in the mobile device.

2. An apparatus according to claim 1, wherein the housing is configured to receive the mobile device to its current position.

3. An apparatus according to claim 1, wherein a change in the mobile device position according to a change of position of the housing is configured to activate the mobile device.

4. An apparatus according to claim 3, wherein the activation comprises at least one of activating the application in the mobile device and/or a change of a variable in the application in the mobile device.

5. An apparatus according to claim 4, wherein the application is one of the following; an audio application, a video application, a multimedia message.

6. An apparatus according to claim 3, wherein the mechanism is configured to change position of the mobile device on the housing with upwards or downwards movement in a cradle of the housing.

7. An apparatus according to claim 1, wherein the detecting element comprises a sensor located in the mobile device or in a cradle of the housing.

8. An apparatus according to claim 7, wherein the sensor is an accelerometer.

9. A mobile device according to claim 1, comprising one of the following; a mobile phone, a personal digital assistant, a music player, an electronic book, an internet tablet.

10. An apparatus comprising:
    means for receiving a mobile device, wherein the means for receiving having at least two positions;
    means for detecting a state of the mobile device;
    means for changing position of the receiving means in response to detecting a change in the state of the mobile device;
    means for reading a token;
    a controller connected to the means for reading which is configured to send a signal to the mobile device based upon the means for reading the token; and
    tokens, where the tokens are associated with an application in the mobile device.

11. An apparatus according to claim 10, wherein the change in the state of the mobile device is predetermined.

12. An apparatus according to claim 10, comprising the means for receiving having three or more positions, means for detecting a predetermined state of the mobile device, means for changing a predetermined position of the receiving means in response to detecting the predetermined change in the state of the mobile device.

13. An apparatus comprising at least one memory and a computer program code configured to, with at least one processor, cause the apparatus to perform at least the following:
    detecting a state of a mobile device received by the apparatus having two positions;
    changing position of a housing of the apparatus in response to detecting a change in the state of mobile device; and sending a signal to the mobile device based upon reading of a token by a token reader of the apparatus, where the token is associated with an application in the mobile device such that the signal is associated with the application.

14. A computer program product comprising a non-transitory computer-readable medium bearing computer program code embodied therein for use with a computer, the computer program code comprising:

code for detecting state of a mobile device received by a housing having at least two positions;

code for changing position of the housing in response to detecting a change in the state of the mobile device; and code for sending a signal to the mobile device based upon reading of a token by a token reader connected to the housing, where the token is associated with an application in the mobile device such that the signal is associated with the application.

15. A non-transitory computer-readable medium encoded with instructions that, when executed by a computer, perform operations of:

detecting state of a mobile device received by a housing having two positions;

changing position of said housing in response to detecting a change in status of the mobile device; and sending a signal to the mobile device based upon reading of a token by a token reader connected to said housing, where the token is associated with an application in the mobile device such that the signal is associated with the application of the mobile device.

* * * * *